(12) United States Patent
Hasenei

(10) Patent No.: US 9,722,428 B2
(45) Date of Patent: Aug. 1, 2017

(54) METHODS AND SYSTEMS FOR DEVICES POWERED VIA ETHERNET CONNECTIONS

(71) Applicant: HENDRICKS INVESTMENT HOLDINGS, LLC, Silver Spring, MD (US)

(72) Inventor: Stephen Ignatius Hasenei, Silver Spring, MD (US)

(73) Assignee: HENDRICKS INVESTMENT HOLDINGS, LLC, Silver Spring, MD (US)

( * ) Notice: Subject to any disclaimer, the term of this patent is extended or adjusted under 35 U.S.C. 154(b) by 788 days.

(21) Appl. No.: 13/871,229

(22) Filed: Apr. 26, 2013

(65) Prior Publication Data

US 2013/0307323 A1  Nov. 21, 2013

Related U.S. Application Data

(60) Provisional application No. 61/638,859, filed on Apr. 26, 2012.

(51) Int. Cl.
*H02J 4/00* (2006.01)
*H04B 3/54* (2006.01)
*G06F 1/26* (2006.01)

(52) U.S. Cl.
CPC .............. *H02J 4/00* (2013.01); *G06F 1/266* (2013.01); *H04B 3/54* (2013.01); *H04B 2203/5458* (2013.01)

(58) Field of Classification Search
CPC ... H02J 4/00; G06F 1/266; H04B 3/54; H04B 2203/5458

USPC ............................................. 307/1
See application file for complete search history.

(56) References Cited

U.S. PATENT DOCUMENTS

| | | | |
|---|---|---|---|
| 6,342,901 B1 * | 1/2002 | Adler | G06F 1/1601 709/201 |
| 6,614,450 B1 * | 9/2003 | Vossler | G06F 3/1423 715/751 |
| 6,857,015 B1 * | 2/2005 | Michaud | G06F 9/465 709/223 |
| 7,565,211 B2 * | 7/2009 | Caveney | H04B 3/44 700/75 |
| 7,982,698 B2 * | 7/2011 | Moulis, Jr. | G06F 3/147 345/82 |

(Continued)

OTHER PUBLICATIONS

Jim Hamblen, Internet LCD Clock, Apr. 12, 2012, ARMmbed, https://developer.mbed.org/users/4180_1/notebook/internet-lcd-clock/.*

(Continued)

*Primary Examiner* — Jared Fureman
*Assistant Examiner* — Michael Warmflash
(74) *Attorney, Agent, or Firm* — Arent Fox LLP

(57) ABSTRACT

Methods and systems are provided to power an appliance coupled to a data connection port, the data connection port having an independent power supply separate from the power grid and being coupled to the appliance via a coupling, wherein the appliance is powered by the independent power supply via the coupling. Methods and systems are provided to power an appliance coupled to an Ethernet port via a Category 5 cable, the appliance being powered via an independent power supply of the Ethernet port via the Category 5 cable, the independent power supply being separate from the power grid.

22 Claims, 6 Drawing Sheets

(56) References Cited

U.S. PATENT DOCUMENTS

| | | | | |
|---|---|---|---|---|
| 8,132,035 B2* | 3/2012 | Juillerat | ............. | G06F 1/266 340/538 |
| 8,406,162 B2* | 3/2013 | Haupt | ............. | H04W 4/02 370/311 |
| 2003/0076745 A1* | 4/2003 | Chapman | ............. | G01W 1/02 368/10 |
| 2007/0036164 A1* | 2/2007 | Goehler | ............. | H04L 12/2803 370/401 |
| 2008/0209241 A1* | 8/2008 | Huang | ............. | G06F 1/266 713/310 |
| 2008/0294915 A1* | 11/2008 | Juillerat | ............. | G06F 1/266 713/300 |
| 2009/0027498 A1* | 1/2009 | Owen | ............. | H04N 7/183 348/151 |
| 2009/0028006 A1* | 1/2009 | Ha | ............. | G04G 5/00 368/46 |
| 2009/0316671 A1* | 12/2009 | Rolf | ............. | H04W 4/02 370/338 |
| 2011/0258016 A1* | 10/2011 | Barak | ............. | G06Q 30/02 705/7.29 |

OTHER PUBLICATIONS

Shruti Bhagat, RSS Feed on Nokia LCD 6610, Feb. 27, 2011, https://developer.mbed.org/users/shrutibhagat/notebook/rss-feed-on-nokia-lcd-6610/.*

* cited by examiner

METHODS AND SYSTEMS FOR DEVICES POWERED VIA ETHERNET CONNECTIONS

This application claims priority from provisional U.S. Patent Application No. 61/638,859, titled "Methods and Systems for Devices Powered via Ethernet Connectors," filed on Apr. 26, 2012, which is incorporated herein by reference in its entirety.

BACKGROUND OF THE INVENTION

1. Field of Invention

Aspects of the present invention relate to methods and systems for providing power to a device via a power source alternative to a conventional power source. More particularly, in one variation, aspects of the present invention relate to methods and systems for providing power to a device over an Ethernet connection.

2. Description of Related Art

In general, electrically powered devices such as televisions, radios, appliances, and the like, are powered via conventional power outlets. Accordingly, during a power outage, and in the absence of a backup source of electricity, none of the appliances can operate, or can operate only for a limited period of time via replaceable individual batteries, because no other electrical power source is available.

With the rapid development of network communications, various wireless communication systems nowadays are coupled via Ethernet connections to data transmission interfaces. For example, conventional wireless communication devices generally include a power supply device and wireless communication features, but such devices may also be connected to an output port via a network cable. According to various aspects of the current invention, electrical power may be transmitted together with the data signal through the network cables to such devices.

Power over Ethernet or PoE technology generally describes systems that transmit electrical power safely, along with data, via Ethernet cabling. The IEEE standard for PoE generally requires Category 5 cables, which are twisted pairs of cables for carrying signals that provide performance of up to 100 MHz. PoE technology may require higher category cables for high power levels, and may operate with Category 3 cables for low power levels. Power is typically supplied in over two or more of the differential pairs of wires found in the Ethernet cables, and may also come from a power supply within a PoE-enabled networking device, such as an Ethernet switch.

Accordingly, providing an alternative source of power that is not derived from conventional power outlets provides the possibility of operating various devices in the case of a grid power failure.

SUMMARY OF THE INVENTION

In light of the above-described problems and other unmet needs, there is a need in the art for appliances that may be connected to a network such as via an Ethernet connection, to be powered directly through such connection. For example, in the case of a hotel guest checking into a hotel room and requiring a wake-up call for an important meeting or appointment, aspects of the current invention may provide a clock radio being powered via Ethernet connections, either as an alternative or as a back-up to power provided via the local power grid, to provide an added layer of security to the hotel guest that may ensure a timely wake-up call in case of a power outage. Further, PoE technology may be deployed in applications where USB (Universal Serial Bus) is unsuitable and where AC (alternative current) power would be inconvenient, expensive or infeasible to supply.

Aspects of the present invention solve the above problems, among others, by providing alternative power sources to various appliances other than the conventional power grid. According to various aspects, PoE offers a number of advantages over a conventional power supply, such as an AC source, or power that may be provided by a USB port, such advantages including at least the following: i) enabling cheaper cabling (e.g., even high quality outdoor Category 5 cables are often cheaper than USB repeaters or AC wire); ii) providing power in conjunction with true gigabyte (one or more Gbps) connection bandwidth, which, for example, may exceed the typical USB bandwidth of about 400 Mbps and the bandwidth of traditional current AC power line networking capabilities of about 450 Mbps; iii) providing a mechanism that can be operated globally to deploy Power to a variety of electric-powered devices without concern for any local variance in AC power standards, outlets, plugs, or reliability, which would make, for example, a single standard office configuration for global organizations much easier to maintain, monitor and update based on a single standard plan; iv) facilitating direct injection from, for example, standard battery power arrays (e.g., 48 V DC batter power arrays), to enable critical infrastructure to run more easily in outages, and allow power rationing decisions to be made centrally for all the PoE devices; v) providing inexpensive, reliable switching, because, while USB coupled devices require a true computer or router to control the bus and still require switching or routing to make VPN or Internet connections, powered Ethernet devices require only a switch, which can be unmanaged; vi) enabling symmetric distribution, because, unlike USB and AC outlets, power can be supplied at either end of the cable or outlet, which means that the location of the power source can be determined after cables and outlets are installed as opposed to before cables and outlets are installed for conventional systems; and vii) enabling scalability, where a large number of appliances operating in a facility, such as a hotel with hundreds or even thousands of rooms, so that devices, e.g., a clock, may be remotely set from a single source, which may save a large number of man-hours in monitoring, maintaining, updating and otherwise operating the devices.

Additional advantages and novel features of these aspects of the invention will be set forth in part in the description that follows, and in part will become more apparent to those skilled in the art upon examination of the following or upon learning by practice of the invention.

BRIEF DESCRIPTION OF THE DRAWINGS

Various example aspects of the systems and methods will be described in detail, with reference to the following figures, wherein.

DETAILED DESCRIPTION

These and other features and advantages in accordance with aspects of this invention are described in, or will become apparent from, the following detailed description.

Figure 1:
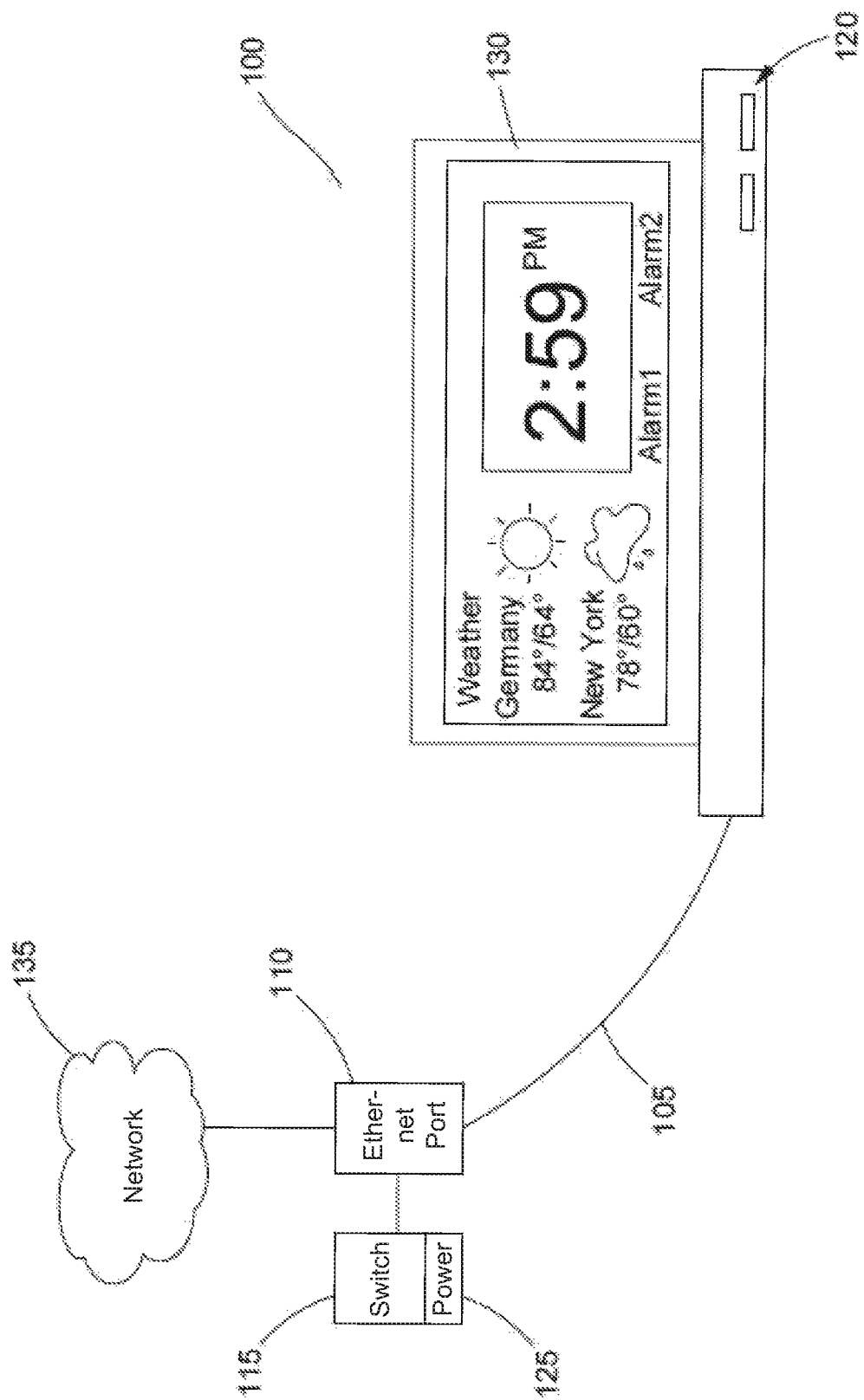
FIG. 1 is an illustration of one view of an example PoE system according to various aspects of the current invention.

FIG. 1 is an illustration of one view of an example PoE system 100 according to various aspects of the current invention. In FIG. 1, the system 100 includes an appliance 130, which may include, for example, an alarm clock, which may be coupled to an Ethernet port 110 via a coupling 105, the Ethernet port 110 being coupled to a network 135 such as, for example, the Internet or the World Wide Web, or a network server. According to various aspects, the Ethernet port 110 may be an outlet mounted on a wall of, for example, a hotel room, and the appliance 130 may be coupled to the Ethernet port 110 on the wall of the hotel room via a direct cable coupling 105. The Ethernet port 110 may, in turn, be coupled to a switch 115 for a data network that has a power source 125 separate and independent from the grid. As a result, power may be transmitted from the independent power source 125 of the switch 115 through the coupling 105 via the Ethernet port 110 and to the device 130, in addition to data being transmitted from the Ethernet port 110.

According to various aspects, the Ethernet connection between the Ethernet port 110 and the device 130 may remain operational for data transmissions even in the event of a failure of the power grid. Furthermore, because of the amount of power that is transmitted from the power source 125 through the coupling 105 and/or the Ethernet port 110, if an appliance 130 is connected to the Ethernet port 110, then the appliance 130 can draw power from the power source 125 of the Ethernet port 110. As a result, in the event of a power failure, the appliance 130 may remain operational instead of being shut down due to the power failure. For instance, the example appliance 130 illustrated in FIG. 1, which may include one or more USB ports 120, may also include a clock display and a weather display that may continue to function in the event of power grid failure.

Thus, in one aspect, if the appliance 130 is an alarm clock connected to the Ethernet port 110, in the event of a power failure, the clock 110 may remain powered via the power source 125 transmitting power through the Ethernet port 110 to the alarm clock 130, and the correct time, which may be provided via a network time server coupled to the Ethernet port 110, may be maintained. Accordingly, a power outage that is the result of, for example, a failure of the grid, may not impact the proper operation of the alarm clock 130, and a hotel guest who has set a wake-up alarm for a specified time may not be impacted by a failure of the power grid.

According to various aspects, when the appliance 130 such as, for example, a clock, is connected to the Ethernet port 110 of, for example, a hotel room, the clock 130 may be remotely operated by the front desk of the hotel, such as at the time a guest calls the front desk to order a wake-up call, or at check-in. According to various aspects, for example, when the guest orders a wake-up call from the front desk, the front desk may remotely access the clock 130 via the Ethernet port 110 and set up the wake-up time on the guest's clock 130, so that the guest may have the option of having either a wake-up call via the telephone or a wake-up music or ring via the clock 130 in the guest's room, of both. This would avoid hotel personnel entering the guest's room and manually setting the alarm clock 130 for the correct wake-up time. As a result, in the event of a power outage due to failure of the grid, a hotel guest requesting a wake-up call or wake-up alarm at a specific time may still receive the wake-up call or wake-up alarm, or both, at the correct time, regardless of any power outage.

According to various aspects, the appliance 130 may also provide additional information other than time such as, for example, weather, news, or more specifically news information related to the guest's current location, the information being provided via the Ethernet port 110. Alternatively, or in addition, the appliance 130 may also display weather or news information for another location, the location being entered directly into the appliance 130 by the guest, or relayed to the guest's room clock 130 via the Ethernet port 110 by the front desk or hotel clerk. In accordance with one aspect, the front desk may remotely arrange for the weather or news information to be displayed on the guest's appliance. Accordingly, the guest may be informed of the weather or news at the guest's next destination (e.g., the guest's home location or a next location provided to the hotel) before checking out of the hotel.

Figure 2:
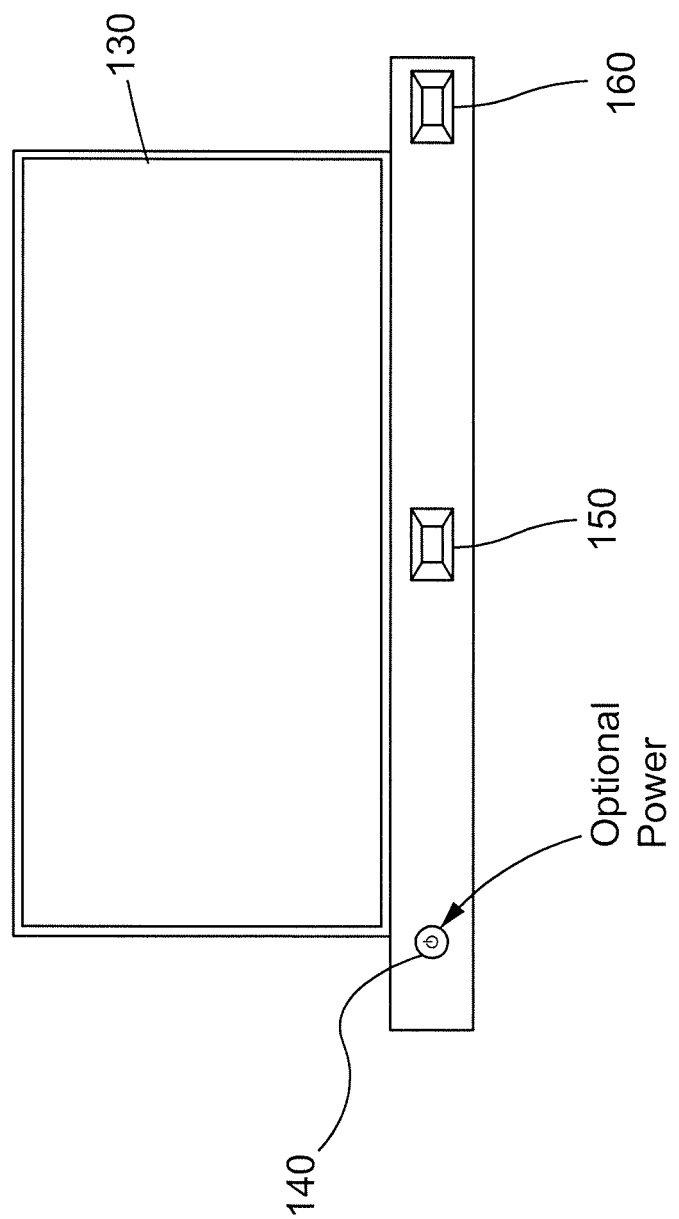
FIG. 2 is an illustration of a second view of an example PoE system according to various aspects of the current invention.

FIG. 2 is an illustration of a second view of an example appliance 130, according to various aspects of the current invention. According to various aspects, the appliance 130 may have an optional power supply port 140 to power up the appliance 130 (e.g., via the power grid when the grid is operating properly), a cable port 150, such as a Category 5 cable port to connect to the Ethernet port 110 via the coupling 105, and a jack 160 to connect the appliance 130 to other devices. According to various aspects, this side of the appliance 130, for example, may also have one or more other data connectors, such as one or more USB ports.

Figure 3:
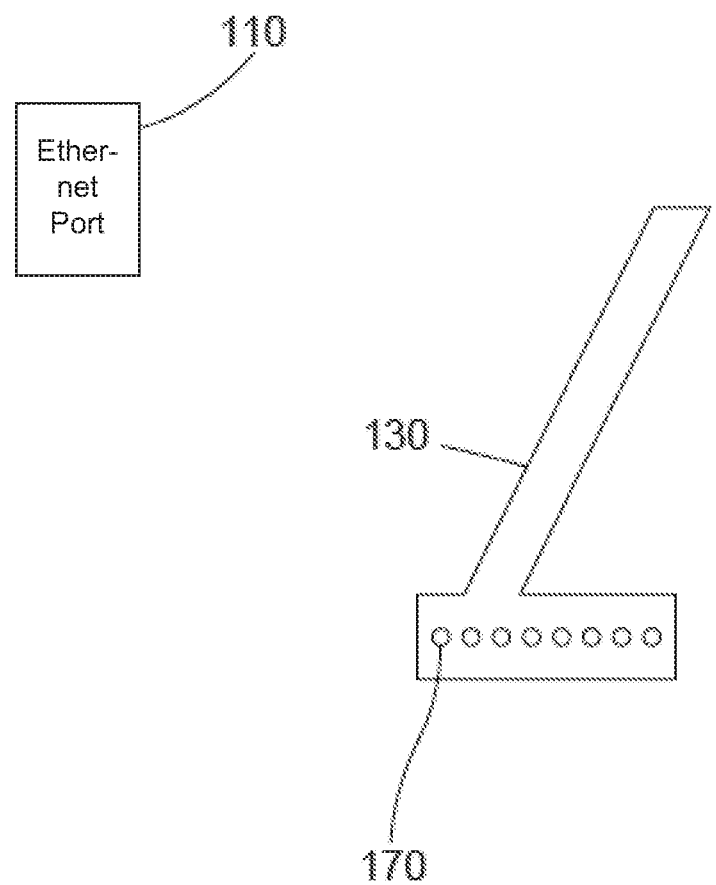
FIG. 3 is an illustration of a third view of an example PoE system according to various aspects of the current invention.

FIG. 3 is an illustration of a third view of an example appliance 130 according to various aspects of the current invention. In FIG. 3, the appliance 130 may also have, for example, Flexible Magnetic Interconnects (FMI) 170 to provide the capability of coupling the appliance 130 to an Ethernet port 110 without having to use a direct physical coupling 105. For example, the FMI 170 for the appliance 130 may include a flexible circuit and a magnetic structure, the magnetic structure being locatable within a recess of the appliance. FMI technology is described, for example, in U.S. Patent Application Publication No. 2010/01970148 (U.S. patent application Ser. No. 12/698,731), which is incorporated herein by reference in its entirety. As a result, power and data or other information may be transmitted from one device, such as the Ethernet port 110, to another device, such as the appliance 130, via FMI 170 located on the appliance 130.

According to various aspects, when the appliance 130, as described above, is located in a hotel room and connected to the Ethernet port 110, the hotel room guest may also connect to the Internet via the appliance 130, even in the case of a power outage, and/or connect the appliance 130 to a smart phone, computer, electronic tablet, and/or other devices (including, for example, a docking station for smart phones, electronic tablets, and the like). Accordingly, in the case of a power failure, the Ethernet port 110 may be both a source of power and a source of internet connection.

Figure 4:
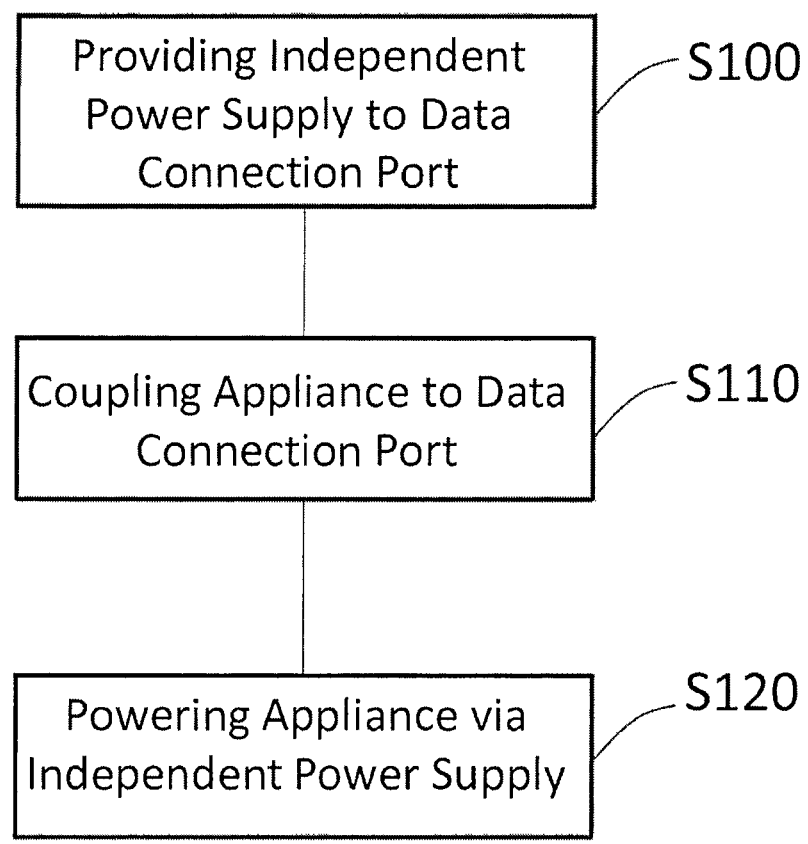
FIG. 4 is a flow chart illustrating a method of providing an alternative power source via PoE, according to various aspects of the current invention.

FIG. 4 is a flow chart illustrating a method of providing an alternative power source via PoE, according to various aspects of the current invention. In FIG. 4, the method starts at S100, where an independent power supply is provided to a data connection port, the independent power supply being separate from the power grid. For example, one or more batteries may be provided as an independent power supply. According to various aspects, the data connection port may be coupled to an appliance via coupling at S110. For example, the data connection port may be an Ethernet port, and the coupling may include an Ethernet cable. According to various aspects, the appliance may be powered by the independent power supply of the data connection port at S120. For example, in the case of a failure in the power grid, an independent power supply of the data connection port such as, for instance, one or more batteries, may power the appliance via the coupling. According to various aspects, the one or more batteries may be provided in a switching device coupled to the data connection port.

According to various aspects of the current invention, the various systems and methods may be implemented via various hardware and system components, as described below.

Figure 5:
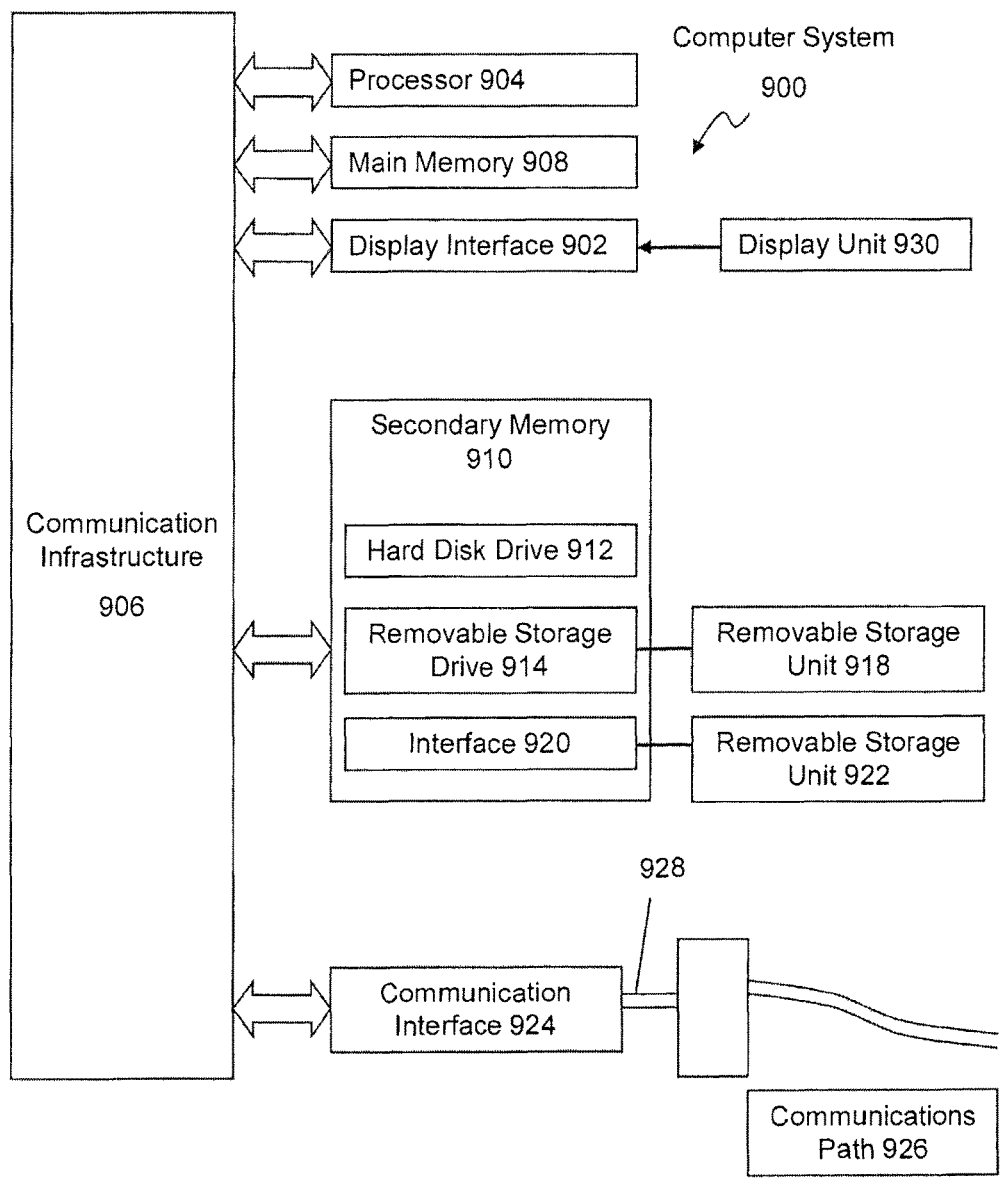
FIG. 5 presents an example system diagram of various hardware components and other features, for use in accordance with an aspect of the present invention.

FIG. 5 presents an example system diagram of various hardware components and other features, for use in accordance with an aspect of the present invention. The present invention may be implemented using hardware, software, or a combination thereof and may be implemented in one or more computer systems or other processing systems. In one aspect, the invention is directed toward one or more computer systems capable of carrying out the functionality described herein. An example of such a computer system 900 is shown in FIG. 5.

Computer system 900 includes one or more processors, such as processor 904. The processor 904 is connected to a communication infrastructure 906 (e.g., a communications bus, cross-over bar, or network). Various software aspects are described in terms of this example computer system. After reading this description, it will become apparent to a person skilled in the relevant art(s) how to implement the invention using other computer systems and/or architectures.

Computer system 900 can include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc., which is read by and written to removable storage drive 914. As will be appreciated, the removable storage unit 918 includes a computer usable storage medium having stored therein computer software and/or data.

In alternative aspects, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928, which may be electronic, electromagnetic, optical or other signals capable of being received by communications interface 924. These signals 928 are provided to communications interface 924 via a communications path (e.g., channel) 926. This path 926 carries signals 928 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 980, a hard disk installed in hard disk drive 970, and signals 928. These computer program products provide software to the computer system 900. The invention is directed to such computer program products.

Computer programs (also referred to as computer control logic) are stored in main memory 908 and/or secondary memory 910. Computer programs may also be received via communications interface 924. Such computer programs, when executed, enable the computer system 900 to perform the features of the present invention, as discussed herein. In particular, the computer programs, when executed, enable the processor 910 to perform the features of the present invention. Accordingly, such computer programs represent controllers of the computer system 900.

In an aspect where the invention is implemented using software, the software may be stored in a computer program product and loaded into computer system 900 using removable storage drive 914, hard drive 912, or communications interface 920. The control logic (software), when executed by the processor 904, causes the processor 904 to perform the functions of the invention as described herein. In another aspect, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another aspect, the invention is implemented using a combination of both hardware and software.

Figure 6:
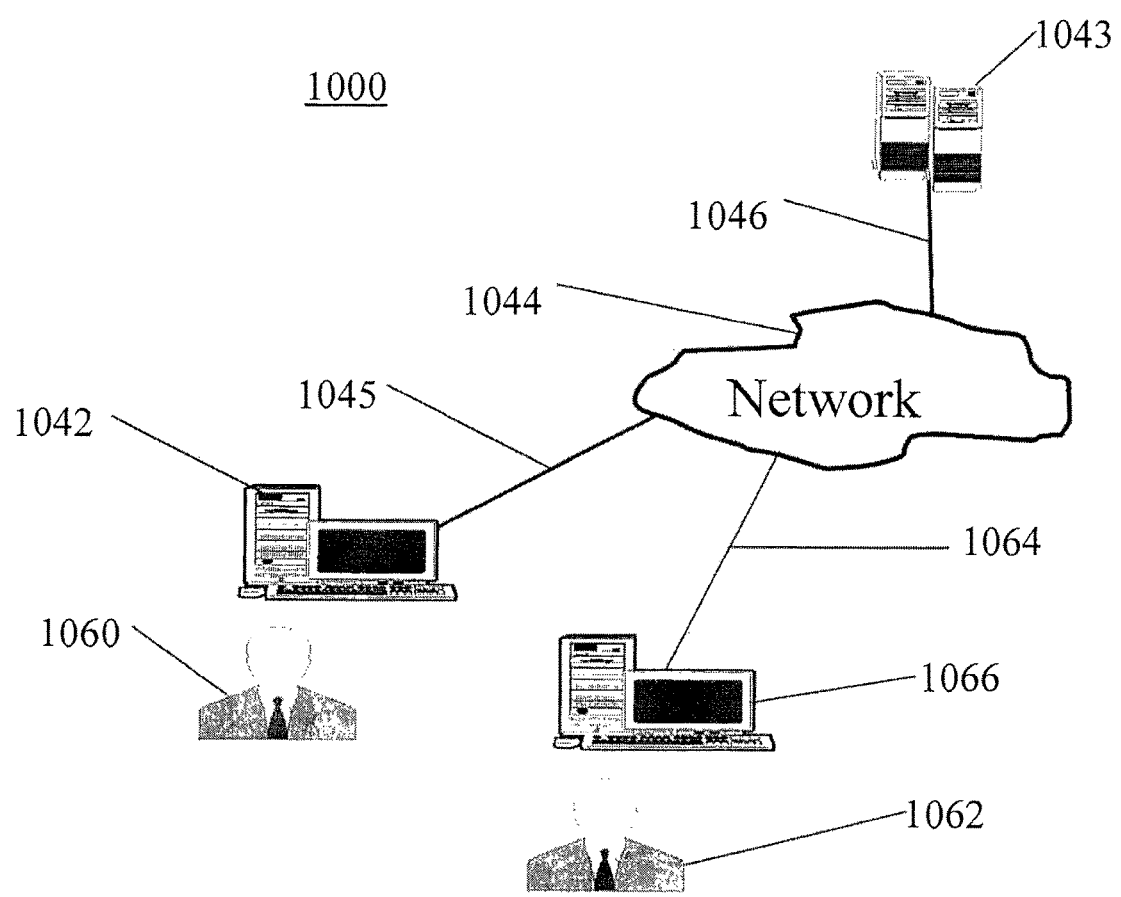
FIG. 6 is a block diagram of various example system components, in accordance with an aspect of the present invention.

FIG. 6 is a block diagram of various example system components, in accordance with an aspect of the present invention. FIG. 6 shows a communication system 1000 usable in accordance with the present invention. The communication system 1000 includes one or more accessors 1060, 1062 (also referred to interchangeably herein as one or more "users") and one or more terminals 1042, 1066, which may, for example, include an appliance 130, as shown and described with regard to FIGS. 1-3. In one aspect, data and/or power for use in accordance with aspects of the present invention is, for example, input and/or accessed by accessors 1060, 1062 via terminals 1042, 1066, such as appliances (e.g., appliance 130 shown in FIGS. 1-3), personal computers (PCs), minicomputers, mainframe computers, microcomputers, telephonic devices, or wireless devices, such as personal digital assistants ("PDAs") or a hand-held wireless devices coupled to a server 1043, such as a PC, minicomputer, mainframe computer, microcomputer, or other device having a processor and a repository for data and/or connection to a repository for data (e.g., such server may be located at a hotel desk or central hotel server location), via, for example, a network 1044, such as the Internet or an intranet, and couplings 1045, 1046, 1064. The couplings 1045, 1046, 1064 include, for example, wired, wireless, or fiberoptic links. In another aspect, the method and system of the present invention operate in a stand-alone environment, such as on a single terminal.

While aspects of this invention have been described in conjunction with the example features outlined above, various alternatives, modifications, variations, improvements, and/or substantial equivalents, whether known or that are or may be presently unforeseen, may become apparent to those having at least ordinary skill in the art. Accordingly, the example aspects of the invention, as set forth above, are intended to be illustrative, not limiting. Various changes may be made without departing from the spirit and thereof. Therefore, aspects of the invention are intended to embrace all known or later-developed alternatives, modifications, variations, improvements, and/or substantial equivalents.

What is claimed is:

1. A system for providing power to a display appliance via a data connection, the system comprising:
    a data connection port having an independent power supply separate from a power grid;
    a first coupling configured to couple the display appliance and the data connection port; wherein the display appliance is powered by the independent power supply of the data connection port via the first coupling, and
    wherein the display appliance is configured to display time and additional information received via the data connection port, wherein the additional information comprises current news;
    a remote server coupled to the data connection port via an internet connection, the remote server being configured to remotely program a clock and to transmit the additional information via the internet; and
    a local area network (LAN) coupled to the data connection port, the LAN configured to be accessed by a remote user able to adjust the additional information based upon preferences of a local user of the system, wherein the additional information further comprises at least one selected from a group consisting of:
    weather information for a current location of the display appliance and second weather information for a second, local user selected location;
    the clock for a current location of the display appliance and a second clock, for the second, local user selected location; and
    news information for a current location of the display appliance and second news information for the second, local user selected location.

2. The system of claim 1, wherein:
    the data connection port comprises an Ethernet port; and
    the first coupling comprises an Ethernet cable.

3. The system of claim 2, wherein the display appliance comprises one or more Ethernet ports.

4. The system of claim 1, wherein the data connection port is coupled to a switching device holding the independent power supply.

5. The system of claim 1, wherein the display appliance comprises one or more ports configured to be coupled with the data connection port via the first coupling.

6. The system of claim 1, wherein the first coupling comprises a Category 5 cable.

7. The system of claim 1, wherein the data connection port is coupled to a network via a second coupling.

8. The system of claim 1, wherein the additional information further comprises current weather received via the data connection port.

9. The system of claim 1, wherein the user selected location is remotely programmable via the LAN.

10. The system of claim 1, wherein the LAN is configured to remotely program an alarm at the clock.

11. A system for providing power to a display appliance via a data connection, the system comprising:
    a processor;
    a user interface functioning via the processor;
    a repository accessible by the processor; wherein
    the display appliance is coupled to a data connection port via a first coupling, the data connection port having an independent power supply separate from a power grid;
    the display appliance is powered by the independent power supply of the data connection port via the first coupling; and
    wherein the display appliance is configured to display time and additional information received via the data connection port, the additional information comprising current news received via the data connection port;
    a remote server coupled to the data connection port via an internet connection, the remote server being configured to remotely program a clock and to transmit the additional information via the internet; and
    a local area network (LAN) coupled to the data connection port, the LAN configured to be accessed by a remote user able to adjust the additional information based upon preferences of a local user of the system, wherein the additional information further comprises at least one selected from a group consisting of:
    weather information for a current location of the display appliance and second weather information for a second, local user selected location;
    the clock for a current location of the display appliance and a second clock, for the second, local user selected location; and
    news information for a current location of the display appliance and second news information for the second, local user selected location.

12. The system of claim 11, wherein:
    the data connection port comprises an Ethernet port; and
    the first coupling comprises an Ethernet cable.

13. The system of claim 11, wherein the data connection port is coupled to a switching device holding the independent power supply.

14. The system of claim 11, wherein the processor is housed on one of a terminal and the remote server.

15. The system of claim 14, wherein the terminal is selected from a group consisting of a personal computer, a minicomputer, a mainframe computer, a microcomputer, a hand held device, and a telephonic device.

16. The system of claim 11, wherein the remote server is selected from a group consisting of a personal computer, a minicomputer, a microcomputer, and a main frame computer.

17. The system of claim 11, wherein the first coupling is selected from a group consisting of a Category 5 cable, a wired connection, a wireless connection, and a fiber-optic connection.

18. The system of claim 11, wherein the data connection port is coupled to a network via a second coupling.

19. A non-transitory computer-readable medium storing computer executable code, comprising code to:
- provide an independent power supply separate from a power grid to a data connection port of a display appliance;
- provide additional information to the data connection port of the display appliance, wherein the additional information comprises current news,
- wherein the display appliance is coupled to the data connection port via a coupling and is powered by the independent power supply of the data connection port via the coupling;
- provide programming of a clock and transmission of the additional information by a remote server via an internet connection coupled to the data connection port; and
- provide access to a remote user able to adjust the additional information based upon preferences of a local user of the display appliance by a local area network coupled to the data connection port, wherein the additional information further comprises at least one selected from a group consisting of:
- weather information for a current location of the display appliance and second weather information for a second, local user selected location;
- the clock for a current location of the display appliance and a second clock, for the second, local user selected location; and
- news information for a current location of the display appliance and second news information for the second, local user selected location.

20. A method for providing power and data to a display appliance via a data connection comprising:
- providing an independent power supply separate from a power grid to a data connection port of the display appliance;
- providing additional information to the data connection port of the display appliance, wherein the additional information comprises current news,
- wherein the display appliance is coupled to the data connection port via a coupling and the display appliance is powered by the independent power supply of the data connection port via the coupling;
- providing programming of a clock and transmission of the additional information at the display appliance by a remote server via an internet connection coupled to the data connection port; and
- providing access to a remote user able to adjust the additional information based upon preferences of a local user of the display appliance by a local area network coupled to the data connection port, wherein the additional information further comprises at least one selected from a group consisting of:
- weather information for a current location of the display appliance and second weather information for a second, local user selected location;
- the clock for a current location of the display appliance and a second clock, for the second, local user selected location; and
- news information for a current location of the display appliance and second news information for the second local user selected location.

21. The method of claim 20, wherein the data connection port comprises an Ethernet port.

22. The method of claim 20, wherein providing the independent power supply comprises providing at least one battery in a switching device coupled to the data connection port.

* * * * *